United States Patent Office 3,655,624
Patented Apr. 11, 1972

3,655,624
MOLDING MATERIALS BASED ON EPOXIDE
COMPOUNDS
Herbert Saran and Manfred Budnowski, Dusseldorf-Holthausen, Germany, assignors to Henkel & Cie, GmbH, Dusseldorf-Holthausen, Germany
No Drawing. Filed Aug. 19, 1968, Ser. No. 753,781
Claims priority, application Germany, Oct. 20, 1967,
H 64,229
Int. Cl. C08g 30/14
U.S. Cl. 260—77.5 NC
2 Claims

ABSTRACT OF THE DISCLOSURE

This invention relates to a hardenable molding material based on organic compounds containing more than one epoxide group in the molecule consisting of (1) a mixture of organic compounds containing more than one epoxide group in the molecule, said mixture containing from 66⅔% to 100% of solid triglycidyl isocyanurate and (2) an amine epoxide resin hardener prereaction product of (a) crystalline triglycidyl isocyanurate and (b) an amine, in such a proportion that from 5% to 30% of the amine groups of said amine are reacted with the epoxide groups of said crystalline triglycidyl isocyanurate. The invention also relates to the hardened epoxide resin produced by heating said hardenable molding material.

THE PRIOR ART

It is well known to subject mixtures consisting of epoxide compounds, hardeners and fillers, which are to be formed into molded plastics, to a controlled prereaction. By this measure, suitable working properties, such as, for example, the pourability, and desired end characteristics of the molded components can be predetermined. However, on utilization of this method, products are obtained which usually have only a limited storability.

In that case where this method is employed for the preparation of molded plastics based on triglycidyl isocyanurates, prereaction substances of only very poor storability are obtained.

Furthermore, it is known to obtain more stable materials by physically admixing a solid epoxide resin, solid amine or an acid anhydride epoxide hardener and solid fillers. However, when this method is employed for the preparation of molded plastics based on triglycidyl isocyanurate, the initial viscosity of the organic phase of the hardenable mixture is so low, that it partly flows out of the casting mold during the molding process.

OBJECTS OF THE INVENTION

An object of the invention is to prepare molded plastic premixes based on solid triglycidyl isocyanurate, which possess a prolonged storability as well as a high initial viscosity when heated to molding temperatures during the molding process.

Another object of the invention is the obtention of a hardenable molding material based on organic compounds containing more than one epoxide group in the molecule consisting of (1) a mixture of organic compounds containing more than one epoxide group in the molecule, said mixture containing from 66⅔% to 100% of solid triglycidyl isocyanurate and (2) an amine epoxide resin hardener prereaction product of (a) crystalline triglycidyl isocyanurate and (b) an amine, in such a proportion that from 5% to 30% of the amine groups of said amine are reacted with the epoxide groups of said crystalline triglycidyl isocyanurate.

A yet further object of the invention is the development of a process for the production of the above hardenable molding material and the obtention of a hardened epoxide resin produced by heating the above hardenable molding material.

These and other objects of the present invention will become more apparent as the description thereof proceeds.

DESCRIPTION OF THE INVENTION

These objects of the invention have been obtained by the preparation of a hardenable molding material based on organic compounds containing more than one epoxide group in the molecule consisting of (1) a mixture of organic compounds containing more than one epoxide group in the molecule, said mixture containing from 66⅔% to 100% of solid triglycidyl isocyanurate and (2) an amine epoxide resin hardener prereaction product of (a) crystalline triglycidyl isocyanurate and (b) an amine, in such a proportion that from 5% to 30% of the amine groups of said amine are reacted with the epoxide groups of said crystalline triglycidyl isocyanurate.

The triglycidyl isocyanurate, to be used according to the invention, should be present in solid form. Preferably, the triglycidyl isocyanurate should be crystallized and should have an epoxide-oxygen content of at least 14%. The preparation of the solid as well as the crystallized triglycidyl isocyanurate is well known as such. By treatment, possibly repeated, of the crude reaction of cyanuric acid with an excess of epichlorohydrin, with an alkali metal hydroxide, a triglycidyl isocyanurate can be obtained. By means of one or repeated recrystallizations from suitable solvents, such as methanol, the preferred crystalline triglycidyl isocyanurate can be obtained from the crude products, having a content of more than 14% of epoxide oxygen. Processes for preparing these products are described in the U.S. Pat. No. 337,509 and U.S. Pat. No. 3,228,-789.

For the production of the molding materials according to the invention, compounds containing amine groups known as so-called polyadduct-forming compounds may be used in the preparation of the amine epoxide resin hardener prereaction product. Suitable compounds are, for example, aliphatic amines, particularly alkylenediamines such as ethylenediamine, propylenediamine, butylenediamine; alkylene polyamines such as diethylenetriamine, triethylenetetramine, N-(4-hydroxybenzyl)-triethylenetetramine; diaminocyclohexane; piperazine and N-(2-aminoethyl) piperazine. Further, condensation products containing free amine groups derived from dimerized fatty acids and polyamines may be used, such as are known, for example, by the trade name "Versamide."

Aromatic amines are preferred for the molding materials according to the invention. For example, the isomeric toluidines, β-naphthylamine, the isomeric phenylenediamines, benzidine, 3,3' - dimethoxy - benzidine, chloraniline, dichloraniline, chlorinated benzidines, 4,4'-diaminodiphenylmethane, 3,3' - dimethoxy - 4,4' - diaminodiphenylmethane, 3,3' - dichloro - 4,4' - diaminodiphenylmethane, 4,4' - diamino - 3,3' - 5,5' - tetrabromodiphenylmethane, 4,4' - diaminodiphenyloxide, diaminodiphenyl sulphide, diaminodiphenylsulphone and N-(hydroxypropyl)-m-phenylenediamine may be used. Among the aforesaid aromatic amines, those which contain more than one amino group are preferred, especially diaminodiphenylmethane, dichlorodiaminodiphenylmethane and diaminodiphenylsulphone.

For the preparation of the epoxide resin hardeners containing amino groups, the proportion of triglycidyl isocyanurate to amine is chosen so that 5 to 30%, especially 12 to 22%, of the epoxide groups needed for the complete reaction are allotted to each amino group in the molecule of the amine. For this purpose the two reactants are melted and, after thorough mixing, are kept for about 1 to 5 hours at 80° to 150° C. After that, all the epoxide groups of the triglycidyl isocyanurate have reacted. Then the reaction product is allowed to cool and is comminuted. The temperature and time of the reaction are dependent on the reactivity of the components used.

The amine epoxide resin hardener prereaction products so obtained are mixed with the triglycidyl isocyanurate in the amount needed for the complete cross-linking of the epoxide groups and free amine groups.

The molding materials also contain fillers, such as, for example, ground shale, ground steatite, asbestos powder or asbestos fibers, glass powder, glass fibers, barium sulphate, mica, kaolin, quartz powder, titanium oxide, aluminum oxide, ground dolomite, calcium carbonate or natural or synthetic fibrous material, and so on. If desired, metal powders such as aluminum, iron, titanium or the like may also be incorporated in the molding materials. Moreover, known lubricants, stabilizers, dyestuffs or plasticizers can be suitably added, if desired.

The molding materials according to the invention may also contain customary epoxide hardening accelerators, such as, for example, benzyldimethylamine, trimethylbenzylammonium chloride, tris(dimethylamino)-phenol or triphenyl phosphine or dicyanodiamide. The latter is suitably used in an amount of 0.5 to 5%, based on the triglycidyl isocyanurate.

The molding materials according to the invention based on triglycidyl isocyanurate can also be modified by the addition of other organic compounds containing more than one epoxide group in the molecule. These epoxides can replace the triglycidyl isocyanurate up to about ⅓ of the total epoxide compounds present. Diglycidyl ethers of polyhydric phenols, for example the diglycidyl ether of diphenylolpropane with an epoxide equivalent of 170 to 1200, are suitable for the said purpose. Moreover, cycloaliphatic epoxide compounds are suitable, such as 3,4 - epoxy - 6 - methyl - hexahydrobenzyl 3',4' - epoxy-6' - methylhexahydrobenzoate or the diepoxide of the acetal from cyclohexene aldehyde and 1,1-dimethylolcyclohexene or diglycidylaniline.

The above-mentioned components for the molding materials according to the invention are mixed in known apparatus, such as, for example, ball mills, pinned disc mills and the like. They are then present usually as a pourable powder, which can be directly molded. In many cases, however, it is expedient to prepare granulates, tablets or small plates therefrom.

The hardenable molding materials according to the invention are marked by an excellent storability. This usually amounts to more than 1 year when held at room temperature.

The further processing of the molding materials is effected in known way by compression molding or transfer molding. The temperature during the molding operation is adjusted to between about 130° and 200° C. and the pressure is adjusted to between about 30 and 400 kg./cm.$^2$. The molding operation requires 1 to 10 minutes according to the temperature employed. In order to be sure that the final properties of the molded bodies are actually obtained, it may be expedient to temper them subsequently for some time, at a temperature of 150° to 220° C. for example.

Molded articles with good mechanical, thermal and electrical properties are obtained from the hardenable molding materials according to the invention.

The following examples serve to illustrate the practice of the invention. However, it is to be understood that they are not to be deemed limitative of the scope of the invention in any manner.

EXAMPLES

The triglycidyl isocyanurate used in the examples was a technical mixture of the high- and low-melting forms and had an epoxide-oxygen content of 15.5% such as described in U.S. Pat. No. 3,337,509. The measured values given were found according to the directions in DIN 53,458, DIN 53,452 and DIN 53,453.

EXAMPLE I 34.5 g. of 4,4'-diaminediphenylsulphone were mixed with 5.5 g. of triglycidyl isocyanurate and heated at 150° C. for 3 hours. After cooling, the product obtained was pulverized.

The prereaction product prepared as described above was intimately mixed by grinding with 51 g. of triglycidyl isocyanurate, 1.5 g. of calcium stearate and 210 g. of ground shale to obtain a hardenable molding powder.

The molding powder so prepared could be stored for more than 1 year.

Slabs of dimensions 120 x 15 x 10 mm. were molded in 5 minutes at a temperature of 165° C. and a pressure of 100 kp./cm.$^2$, and were then tempered at 180° C. for 20 hours. The following average values were measured on the tempered molded slabs.

Martens temperature—210° C.
Flexural strength—980 kp./cm.$^2$
Impact strength—4.5 kp. cm./cm.$^2$

EXAMPLE 2

36.3 g. of 3,3'-dichloro-4,4'-diaminodiphenylmethane were mixed with 10.7 g. of triglycidyl isocyanurate and the mixture heated at 150° C. for 3 hours. After cooling, the fused mass was pulverised.

The prereaction product prepared as described above was mixed with 43 g. of triglycidyl isocyanurate, 210 g. of ground shale and 9 g. of calcium stearate, and ground to obtain a hardenable molding powder.

At room temperature the powder mixture could be stored for more than a year.

Standard bars were molded from the molding powder at a temperature of 165° to 170° C. and a pressure of 150 kp./cm.$^2$ for 10 minutes. These were tempered at 160° C. for 17 hours. Then the following average values were measured:

Martens temperature—205° C.
Flexural strength—770 kp./cm.$^2$
Impart strength—4.7 kp. cm./cm.$^2$

EXAMPLE 3

30 g. of 4,4'-diamino-diphenylmethane were mixed with 9 g. of triglycidyl isocyanurate and heated at 150° C. for 3 hours. After cooling, the prereaction product was ground. It was well mixed with 51 g. of triglycidyl isocyanurate, 210 g. of ground shale and 9 g. of calcium stearate to obtain a hardenable molding powder.

This molding powder could be stored at room temperature for more than a year.

Standard bars were molded from the molding material at 130° C. and a pressure of 150 kp./cm.$^2$ in a period of 10 minutes, and were tempered at 160° C. for a further 17 hours. The following average values were measured on the sample articles.

Martens temperature—211° C.
Flexural strength—820 kp./cm.$^2$
Impact strength—4.5 kp. cm./cm.$^2$ The preceding specific embodiments are illustrative of the practice of the invention. It is to be understood, however, that other expedients known to those skilled in the art can be employed without departing from the spirit of the invention.

We claim:
1. A hardenable molding material based on organic compounds containing more than one epoxide group in the molecule consisting of (1) crystalline triglycidyl iso- cyanurate and (2) a pulverized, completely reacted amine epoxide resin hardener prereaction product produced at temperatures above the melting point of the ingredients of (a) an aromatic polyamine selected from the group consisting of diaminodiphenylmethane, dichlorodiaminodiphenylmethane and diaminodiphenylsulfone and (b) sufficient crystalline triglycidyl isocyanurate to react with from 5% to 30% of the amine groups of said aromatic polyamine, said ingredient (2) containing free amine groups in the molecule being present in an amount required for complete cross-linking of the epoxide groups in said ingredient (1).

2. The hardenable molding material of claim 1 wherein said pulverized, completely reacted amine epoxide resin hardener prereaction product is a prereaction product of (a) said aromatic polyamine and (b) sufficient crystalline triglycidyl isocyanurate to react with from 12% to 22% of the amine groups of said polyamine.

References Cited

UNITED STATES PATENTS

| | | | |
|---|---|---|---|
| 3,484,408 | 12/1969 | Holm | 260—47 |
| 3,479,302 | 11/1969 | Saran | 260—2 |
| 3,474,056 | 10/1969 | Schneider | 260—18 |
| 3,377,509 | 8/1967 | Budnowski | 260—77.5 |
| 3,271,350 | 9/1966 | Vertnik | 260—2 X |

OTHER REFERENCES

Handbook of Epoxy Resins; Lee & Neville; McGraw Hill; N.Y. 1967; pages 20–11 and 20–13.

DONALD E. CZAJA, Primary Examiner

C. W. IVY, Assistant Examiner

U.S. Cl. X.R.

260—18 eP, 18 PN, 37 eP, 830 P, 830 TW